United States Patent [11] 3,622,965

| [72] | Inventor | Chang Sheng Wu<br>Houston, Tex. |
|---|---|---|
| [21] | Appl. No. | 47,416 |
| [22] | Filed | June 18, 1970 |
| [45] | Patented | Nov. 23, 1971 |
| [73] | Assignee | Western Geophysical Company of America<br>Houston, Tex. |

[54] METHOD OF GEOPHYSICAL PROSPECTING BY MEASURING THE ATTENUATION OF SEISMIC WAVES IN THE EARTH
8 Claims, 2 Drawing Figs.

| [52] | U.S. Cl. | 340/15.5 AC |
|---|---|---|
| [51] | Int. Cl. | G01v 1/00 |
| [50] | Field of Search | 340/15.5 AC, 15.5 DP, 15.5 CC |

[56] References Cited
UNITED STATES PATENTS

| 3,292,142 | 12/1966 | Russell | 340/15.5 BH |
|---|---|---|---|
| 3,270,316 | 8/1966 | Walker | 340/15.5 AC |
| 3,251,029 | 5/1966 | Savage | 340/15.5 AC |
| 3,339,139 | 8/1967 | Lee | 340/15.5 CF |
| 2,752,092 | 6/1956 | McDonal | 340/15.5 CF |
| 2,696,891 | 12/1954 | Neufeld | 340/15.5 CF |

*Primary Examiner*—Richard A. Farley
*Assistant Examiner*—Joseph G. Baxter
*Attorney*—Michael P. Breston ABSTRACT: A method of seismographic exploration, to determine the attenuation coefficient in a layer from which there is obtained substantial and persistent reflection energy, by: transforming the detected reflected signals to an integral transform domain, selecting a band of transform variables over which there is substantial and persistent reflection energy, and measuring the ratios of the amplitudes of the transformed signals to obtain a measure of the attenuation coefficient of the reflected seismic signals in the studied layer.

CHANG SHENG WU,
INVENTOR.

BY MICHAEL P. BRESTON
ATTORNEY.

METHOD OF GEOPHYSICAL PROSPECTING BY MEASURING THE ATTENUATION OF SEISMIC WAVES IN THE EARTH

BACKGROUND OF THE INVENTION

In seismic exploration of the earth by the reflection method, it has been customary to initiate a seismic disturbance at or near the surface of the earth (or at sea, at or near the surface of the water), and to detect and record the amplitude of the returning, reflected seismic signals by means of arrays, detectors, and recording apparatus well known in the art.

Hitherto, the amplitude information in the reflected seismic signals has been used only to detect, define, and delineate major subterranean discontinuities between different rock layers. That is, when the amplitude of a seismic signal is found to be somewhat greater than that of the background signal, it is assumed that such an anomalous amplitude is evidence of the reflection of seismic waves from such a discontinuity. Persistence of such an increased amplitude among successive positions along a line of survey is taken as confirmation of the existence of a discontinuity, comprising an extensive surface, between two different rock formations.

In the prior art no attempt is made to determine the nature of the rocks involved. All of the displays and the analysis of the seismograph data are based solely on the rock strata configurations determined from a knowledge of the location and orientation of the discontinuities. Identification of lithology or rock type is confined to information obtained at outcrops or in drilled wells. Persistence of lithological identity along strata delineated by the seismic method is generally assumed.

A given stratum is laterally continuous by reason of having been laid down or formed contemporaneously throughout its lateral extent. It is, however, well known that economically significant accumulations of petroleum or natural gas are frequently identified with lateral changes in the lithologic character of a stratum. To detect changes in the lithology of a stratum by use of reflection seismic data has long been a desideratum of the exploration industry.

It is well known that one physical property of a rock type which depends upon lithologic character is the rate of attenuation undergone by an acoustic or seismic wave as it traverses a rock of that type.

SUMMARY OF THE INVENTION

This invention provides a method of seismographic exploration by determining the attenuation of reflected seismic signals through layers of the earth. The reflected seismic signals are detected from the upper and lower boundaries of a selected layer from which there is substantial and persistent reflection energy. The detected signals are then transformed from the time domain to the integral transform domain over a band of transform variables. A measure of the attenuation coefficient of the reflected seismic signals through the layer is obtained by measuring the ratio of the transformed amplitudes over the selected band. In a preferred embodiment the integral transform is a Fourier transform and the selected band is limited to a single frequency.

Figure 1:
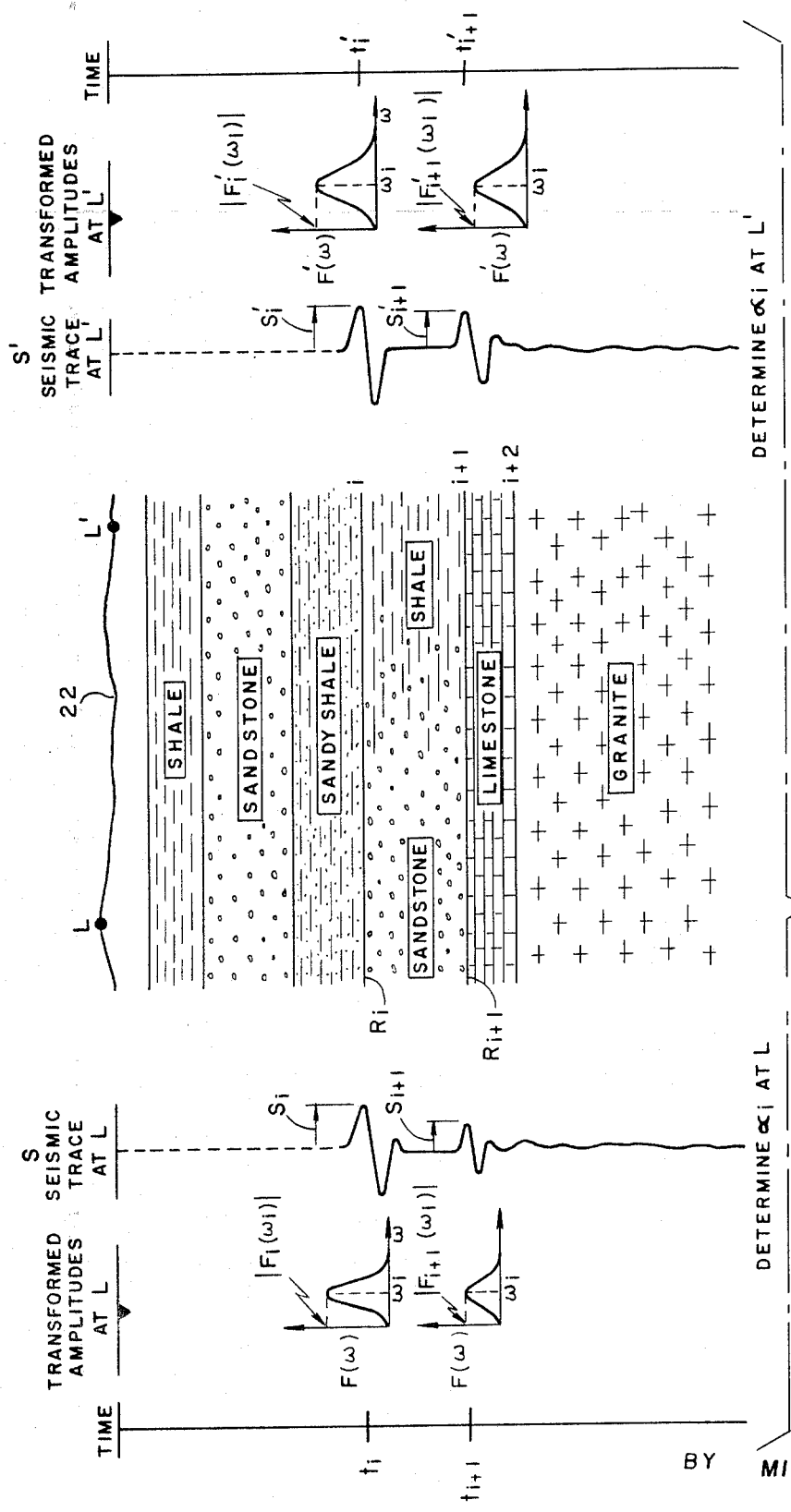
FIG. 1 is a diagrammatic representation of a typical geologic section undergoing seismographic exploration.

Attenuation undergone by a seismic wave in traversing a given rock stratum is manifested by a decrease in the amplitude of the seismic wave in excess of the decrease in amplitude as a result of geometric spreading. Geometric spreading is explained by the observation that if a sound wave is initiated at a point in a homogeneous, isotropic medium, that sound wave will radiate in the form of an expanding spherical wave front whose center is at the point of initiation. Since the medium cannot add energy to the sound wave, and if the medium is perfectly elastic so that it does not subtract energy from the sound wave, the energy in the wave will remain constant. Since, however, the spherical wave is expanding and the total energy must remain constant while being distributed over an ever larger surface, the energy passing through a unit area of the sphere will decrease in inverse proportion to the surface area of the sphere. A given detector of fixed area will, therefore, detect the sound wave at an energy level inversely proportional to the area of the sphere. Since it is proved in classical solid geometry that the area of a sphere is directly proportional to the square of the radius, it follows that the detected energy is inversely proportional to the square of the distance from the point of initiation to the detector.

Also, since the medium is assumed to be homogeneous, the distance traversed by the sound wave is the product of the velocity of sound in the medium by the travel time of the sound wave.

Therefore, the energy $E$ at any unit area on the expanding wave is $$E = k t^{-2} \quad (1)$$

where $t$ is the travel time and $k$ is a constant of proportionality.

If now the medium is still perfectly elastic but not homogeneous, this same relationship between energy and time can be shown to be a reasonably accurate description of the actual geometrical spreading. Likewise, it can be shown that, on the average, the amplitude of a sound wave is proportional to the square root of its energy so that one finally arrives at the working formula $$A = k'/t \quad (2)$$

where $A$ is the amplitude of the sound wave and $k'$ is another constant of proportionality. This relationship is well known to be valid even after the sound wave has undergone specular reflection, provided that the corresponding reflection coefficient is equal to unity.

For purposes of clarity, the following description is written on the basis that sound waves traversing or being reflected from a discontinuity or interface are substantially perpendicular to that interface. This is termed the case of "normal incidence." Generalizations of the equations and procedures given below to cases of nonnormal incidence are well known and will be apparent to those skilled in the art of seismology.

In the case of rock strata in a real geologic section, the individual strata are generally assumed to be vertically homogeneous and subject to gradual lateral variations. Reflection coefficients at the interfaces between strata are never equal to one but have a substantially lower value which rarely exceeds 0.1.

It is thus clear that sound wave amplitudes will be reduced not only by geometrical spreading but also by the losses of energy upon reflection. An additional loss is produced on transmission through an interface because a part of the energy is reflected and another part is converted from a longitudinal acoustic wave to transverse waves of various sorts. This loss is relatively insubstantial at or near normal incidence, and may be calculated in nonnormal incidence cases from a knowledge of velocities and an estimate of Poisson's ratio.

Any energy lost by the reflected sound wave, over and above the losses from geometrical spreading, partial reflection, and mode conversion, is assumed to have been dissipated in traversing the individual rock strata. Such losses are here termed attenuation losses, and the relative loss is proportional to the distance traversed. The constant of proportionality is known as the attenuation coefficient and is ordinarily given in units of nepers per meter. Thus, $$dE/E = -a \, ds \quad (3)$$

where $a$ is the attenuation constant of the medium and $s$ is the distance traversed by the wave in the medium.

It therefore follows that, $$E = c \exp(-as) \quad (4)$$

where $c$ is a constant of integration. Finally, on converting to variables of amplitude and time as above, one obtains $$A = \exp(-\alpha t + \beta) \quad (5)$$

where $\alpha$ is proportional to $a$, and $\beta$ is a constant.

This invention, therefore, comprises a method of obtaining an estimated value of the attenuation parameter $\alpha$ from seismic reflection data. Fundamentally such a determination is made by obtaining the ratio of the amplitudes of two seismic reflections, received at the same position along a line of survey but separated from each other in total travel time.

Thus, if two reflection events occur at times $t_i$ and $t_{i+1}$ and have idealized amplitudes $A_i$ and $A_{i+1}$, the ratio is $$A_{i+1}/A_i = \exp \alpha(t_i - t_{i+1}) \qquad (6)$$

from which $$\alpha = \frac{-1}{t_{i+1} - t_i} \ln(A_{i+1}/A_i) \qquad (7)$$

Thus the attenuation parameter $\alpha$ applicable to that portion of the geologic section between reflecting interfaces corresponding to times $t_i$ and $t_{i+1}$ is obtainable from the ideal quantities $A_i$, $A_{i+1}$, and the observed times $t_i$, and $t_{i+1}$.

However, in actual practice the observable quantities $A_i$ and $A_{i+1}$ are not representative of the amplitudes which would obtain in the absence of geometrical spreading and in the idealized case of perfect reflection. It is therefore necessary that both geometrical spreading and reflection coefficient values be taken into account before applying equation (7).

In a commonly used reflection seismic exploration procedure, seismic signals are recorded by the well-known digital, binary-gain method in which actual seismic amplitudes are recorded in a code which is equivalent to floating point notation and is thus capable of preserving the full range of received amplitudes.

To practice the present invention it is necessary to obtain (at least up to a multiplicative constant) the actual values of signal amplitudes. It is therefore a preferred practice to use binary-gain recording and not to apply any automatic volume or gain controls. Even the use of programmed gain is preferably to be avoided as errors may be introduced by use of programmed gain and the consequent application of a gain recovery procedure.

In editing reflection seismic data for use in the present invention, it is preferred to retain the data in floating point (or binary-gain) form throughout the preparatory stages of processing and to apply only a geometric spreading correction as, for example, by multiplying all amplitudes by the reflection time.

If no gain or amplitude compensation except that for geometric spreading has been applied to the data, it will be presumed that all amplitude variations remaining are attributable to attenuation and to reflection coefficients less than unity.

Because the persistent reflected signals received from discontinuities in the subsurface are relatively complex pulses that can vary in shape and length (due to random noise effects, multiple and other effects well known to anyone skilled in the art of reflection seismology), it is relatively difficult to determine the proper measured values of amplitude to be used in equation (7). This problem can be circumvented by computing the required ratios in the frequency domain rather than on amplitude data in the time domain.

Further, it has been observed that quite frequently the reflection coefficient for a given geological interface does not change appreciably over an area of considerable lateral extent. This persistence is especially to be observed if related to a fixed frequency or small frequency band in the reflected pulses.

In order, therefore, to minimize or avoid the effect of variable signal shape and length, and to avoid the need to predetermine by some other means the effect of reflection coefficients on amplitude measurements, I have found it effective first to select persistent reflecting interfaces as upper and lower boundaries of a zone for which attenuation is to be determined. Second, I transform the seismic signal corresponding to each of these reflecting interfaces from the time domain to the frequency domain. For each interface or pair of interfaces I select a suitable frequency value (or frequency band) corresponding to which there is substantial and persistent reflection energy (or amplitude). Finally, I apply equation (7) to the amplitudes of the transformed reflection signals at the selected frequency (or frequency band).

Otherwise stated, if the reflected signal (corrected for geometrical spreading) corresponding to the $i^{th}$ interfaces is $S_i(t)$ and is defined from $t = t_i$ to $t = t_{i+1}$ and is equal to zero outside this interval, then the Fourier transform $F_i(\omega)$ of $S_i(t)$ is given by the formula $$F_i(\omega) = \int_{-\infty}^{\infty} exp\ (i\omega t) S_i(t) dt \qquad (8)$$

For convenience in the following discussion, I will treat the case where one frequency is selected.

If now the selected frequency for the $i^{th}$ layer is $\omega_i$, the amplitude to be used in place of $A_i$ in equation (7) is $|F_i(\omega_i)|$.

Alternatively, it is equally possible to employ the sine or cosine transforms rather than the complex transform given in equation (8). Other integral transforms such as the Laplace may also validly be used, or one could compute the power spectrum for use.

A further alternative is to define $S_i(t)$ as a periodic function with period T. The Fourier transform (8) then becomes the Fourier series and the selection of possible frequencies $\omega_i$ is perforce restricted to the fundamental frequency $1/T$ and its harmonics. Such a restriction is not significant in that, in general, a range of frequencies will be found to be acceptable, and furthermore the derived Fourier transforms are normally produced by digital processes and presented as discrete samples so that the choice of frequencies is essentially limited even if the continuous transform is used.

In summary then, the value of attenuation is given by, $$\alpha = \frac{-1}{t_{i+1} - t_i} \ln \left[ |F_{i+1}(\omega_i)| / |F_i(\omega_i)| \right] \qquad (9)$$

It is to be expressly understood that equation (9) is equally valid if $F_i(\omega_i)$ is defined an any discrete or continuous finite or infinite integral transform of the function $S_i(t)$, and that $S_i(t)$ may be completed outside the interval of definition $t_i < t < t_i + T$ in any manner compatible with the validity of the transform to be used.

The technique outlined above can be applied equally well in the case where the reflection coefficient must be taken into account, as described in copending application, Ser. No. 47,415 assigned to the same assignee. In that case the value of attenuation is $$\alpha = \frac{-1}{t_{i+1} - t_i} \ln \frac{R_i |F_{i+1}(\omega_i)|}{R_{i+1} |F_i(\omega_i)|} \qquad (10)$$

The value $\alpha$ for any layer between two interfaces is thus determinable from observed quantities and may be used in the form of a display similar to that of a conventional record section of seismic amplitudes by substituting the so obtained values of $\alpha$ for the conventional amplitude values.

The computations may alternatively be made (as is well known in the art) to yield other measures of attenuation such as, for example, the logarithmic decrement.

Alternatively, the attenuation values may be displayed in conjunction with other values as more completely described in copending application, Ser. No. 853,467 assigned to the same assignee.

Figure 2:
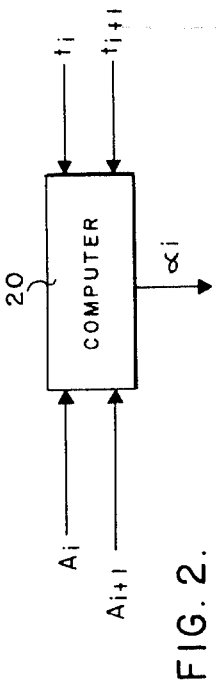
FIG. 2 represents a digital computer adapted to carry out the mathematical operations required for obtaining a measure of the attenuation of the waves traversing through the strata in the geologic section of FIG. 1.

In FIG. 1 the geologic section which includes shale, sandstone, sandy shale, shale, sandstone and shale, limestone, granite, etc., provides a seismic S trace which is obtained for location L on the earth's surface and another seismic S' trace for location L'. From these seismic S traces along a line of survey 22 it is possible to determine the attenuation coefficient for the desired layer between the $i^{th}$ and the $(i+1)$ interfaces in accordance with equation (9). The mathematical manipulations required by the equations set forth above can be conveniently carried out by a computer 20 as shown in FIG. 2. The inputs to the computer 20 are $A_i, A_{i+1}, t_i$, and $t_{i+1}$. Alternatively these computations can be carried out by hand with the use of trigonometric and logarithm tables.

In sum, the conventional recordings of the amplitude traces are used first to delineate subterranean discontinuities and to then obtain the corresponding seismic S curves for the line of survey 22. From the S curves it is therefore possible to obtain confirmation of the existence of lateral variations or discontinuities in the lithologic characteristics, as for example, between the $i^{th}$ and the $(i+1)$ interfaces, (a change from sandstone to shale). It will be noted that the transformed amplitude $|F_{i+1}(\omega_i)|$ of the S curve at the L location is attenuated to a greater extent than the corresponding transformed amplitude $|F'_{i+1}(\omega_i)|$ of the S' curve at the location L', since the sandstone portion attenuates the waves more than the shale portion.

What I claim is:

1. A method of seismographic exploration by determining a measure of the attenuation of reflected seismic signals in a layer of earth studied comprising the steps of:
   propagating acoustic signals through said layer;
   detecting in the time domain the reflected seismic signals from the upper and lower boundaries of said layer;
   transforming both of said detected reflected seismic signals from the time domain to the integral transform domain thereby forming two distinct transformed signals;
   selecting a band of transform variables over which there is substantial reflection energy; and
   obtaining a measure of the attenuation coefficient of the reflected seismic signals through said layer by measuring the ratio of the amplitudes of said transformed signals over said selected band of transform variables.

2. The method of claim 1 and further including the step of:
   compensating, prior to the transforming step, the amplitude of the detected reflected seismic signals for geometric spreading.

3. The method of claim 1 wherein,
   said integral transform is a Fourier transform; and
   said selected band of transform variables is a selected band of frequencies.

4. The method of claim 3 wherein,
   said band is limited to a single frequency.

5. The method of claim 3 wherein,
   said Fourier transform is represented as a Fourier series.

6. The method of claim 1 wherein,
   said integral transform is a Laplace transform.

7. The method of claim 1 wherein,
   said integral transform is the spectral density function.

8. The method of claim 1 wherein,
   said layer is relatively large, and
   said boundaries are selected to provide substantial and persistent reflected energy.

* * * * *